United States Patent [19]

Stone

[11] Patent Number: 4,613,182

[45] Date of Patent: Sep. 23, 1986

[54] SIDE PANEL ASSEMBLY

[76] Inventor: Jack C. Stone, Box 53, Marlow, Okla. 73055

[21] Appl. No.: 644,346

[22] Filed: Aug. 27, 1984

[51] Int. Cl.⁴ .............................................. B62D 27/00
[52] U.S. Cl. ..................................... 296/181; 296/10; 296/40; 105/378
[58] Field of Search .................. 296/181, 183, 191, 10; 105/378, 379, 370, 371, 372

[56] References Cited

U.S. PATENT DOCUMENTS

| | | | |
|---|---|---|---|
| 2,766,062 | 10/1956 | Martin | 296/10 |
| 2,974,996 | 3/1961 | Bitterman | 296/181 |
| 3,010,755 | 11/1961 | Black | 296/181 |
| 3,126,224 | 3/1964 | Carter | 296/181 |
| 3,155,419 | 11/1964 | Garson | 296/10 |
| 3,205,002 | 9/1965 | Seng | 296/10 |
| 3,266,837 | 8/1966 | Stricker | 296/181 |

Primary Examiner—Robert R. Song
Attorney, Agent, or Firm—Dunlap, Codding & Peterson

[57] ABSTRACT

A side sectional panel assembly for use on a trailer having side beams along the sides of the trailer bed. Each side panel section is hinged to the trailer by a hinge assembly pivotally connected to the side panel and removably connected to the side beam of the trailer to limit the swinging movement of the panel section away from the trailer bed to an upright position and permits swinging movement of the panel section onto the trailer bed. End panel connectors are provided on the adjacent panel section to bridge the gap therebetween.

12 Claims, 9 Drawing Figures

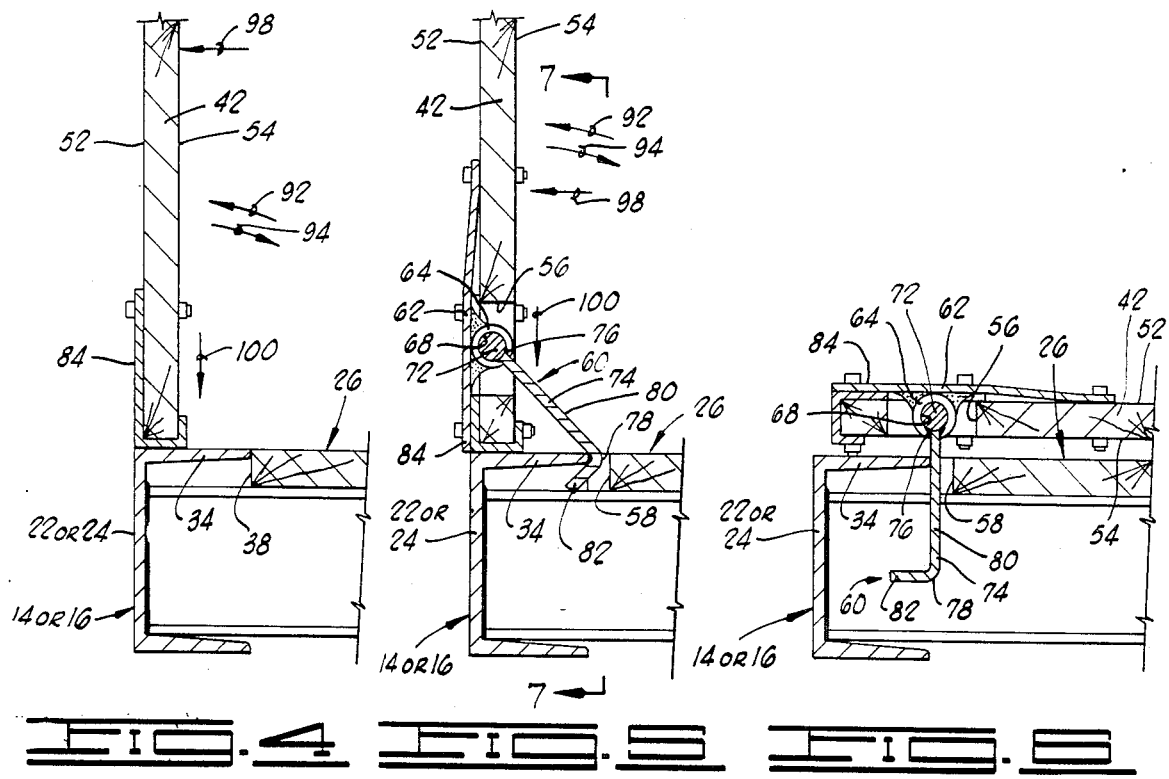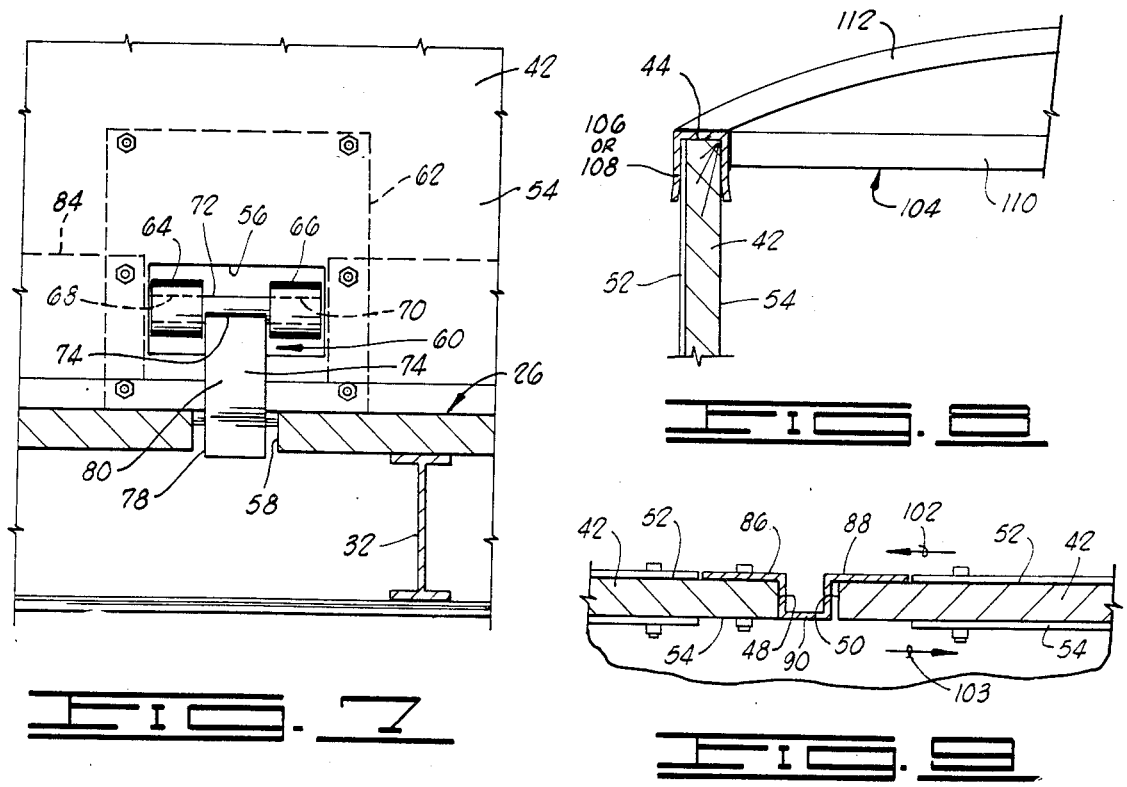

SIDE PANEL ASSEMBLY

BACKGROUND OF THE INVENTION

Field of the Invention

The present invention generally relates to side panels adapted to be connected to a trailer for forming the trailer side walls and, more particularly, but not by way of limitation, to a side panel assembly adapted to be connected to a trailer having a hinge assembly which is removably connectable to one of the trailer side support beams and having an end panel connector to provide a movable connection between two adjacent side panels in an assembled side-to-side relationship of the side panels.

BRIEF DESCRIPTION OF THE DRAWINGS

FIG. 4 is a sectional view, taken substantially along the lines 4—4 of FIG. 2.

FIG. 5 is a sectional view, taken substantially along the lines 5—5 of FIG. 2.

FIG. 6 is a sectional view, similar to FIG. 5, but showing the side panel in a storage position.

FIG. 7 is an elevational view showing a hinge assembly connected to a panel assembly taken substantially along the lines 7—7 of FIG. 5.

FIG. 8 is an enlarged view showing a typical side panel connected to the overhead brace assembly.

FIG. 9 is a sectional view of two side panels showing the two side panels in a side-to-side assembled relationship.

DESCRIPTION OF THE PREFERRED EMBODIMENT

Figure 1:
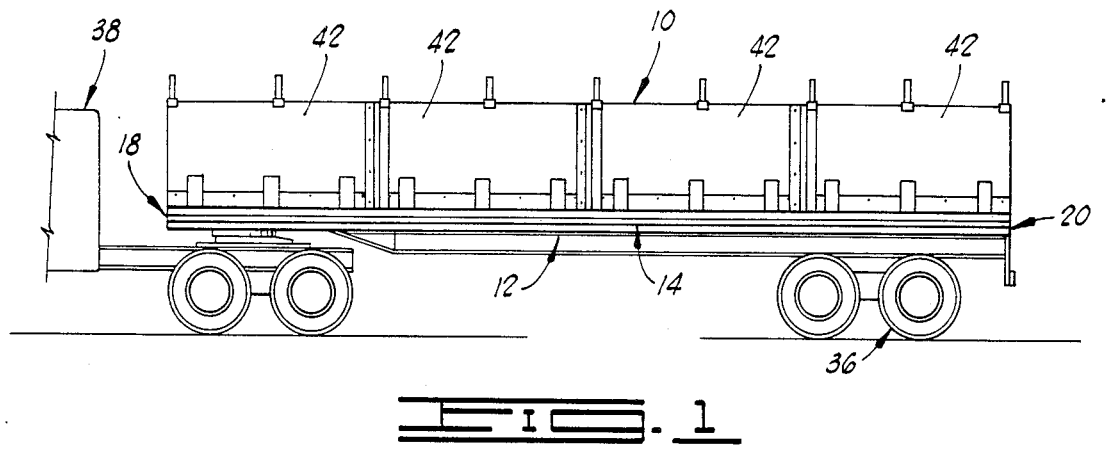
FIG. 1 is a side elevational view of a trailer having a side panel assembly connected thereto for forming the trailer side walls, the side panel assembly being constructed in accordance with the present invention.
Figure 2:
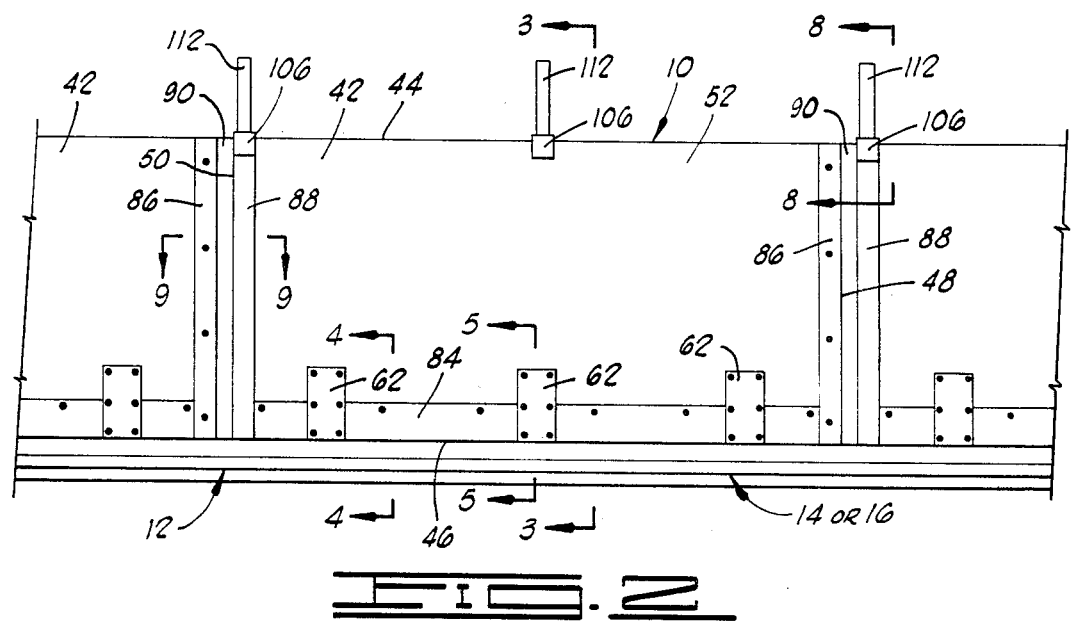
FIG. 2 is an enlarged side elevational view of a portion of the side panel assembly shown in FIG. 1, showing a typical side of the trailer.
Figure 3:
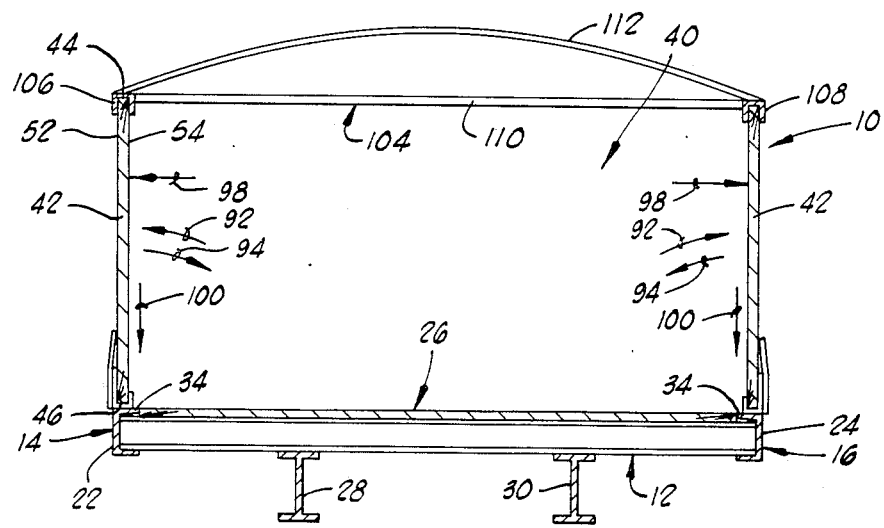
FIG. 3 is a sectional view showing two side panels connected to a trailer wherein the side panels each are positioned in the upright position.

Referring to the drawings in general and to FIGS. 1, 2 and 3 in particular, shown therein and designated by the general reference numeral 10 is a side panel assembly which is adapted to be connected to a trailer 12 for forming the trailer side walls. The trailer 12 has opposite sides 14 and 16, opposite ends 18 and 20, a pair of side support beams 22 and 24 and a trailer floor or bed 26. The trailer 12 also includes a pair of main I-beams 28 and 30 with each of the I-beams 28 and 30 extending generally between the opposite ends 18 and 20 of the trailer 12 and cooperating with crossbeams for providing the primary support for the trailer 12 structure (a typical crossbeam being shown in FIG. 7 and designated therein by the reference numeral 32).

Each of the side support beams 22 and 24 extends generally between the opposite ends 18 and 20 of the trailer 12 with the side support beam 22 forming the side 14 and the side support beam 24 forming the side 16 of the trailer 12. The side support beams 22 and 24 each are generally U-shaped and each of the side support beams 22 and 24 includes an upper beam flange 34 which extends a distance from one of the sides 14 and 16 inwardly in a plane generally coplanar with the trailer floor 26, the beam flanges 34 also being disposed generally adjacent the upper surface of the trailer floor 26.

The trailer 12 is rollingly supported on at least a pair of wheel assemblies (one wheel assembly 36 being shown in FIG. 1 and designated therein by the reference numeral 36), and the end 18 of the trailer 12 is adapted to be connected to one end of a vehicle 38 (a portion of the vehicle 38 being shown in FIG. 1) so the vehicle 38 can pull the trailer 12 in a conventional manner.

Trailers which have opposite sides, opposite ends, side support beams, a trailer floor and main I-beams like the trailer 12 generally described before are well known in the art and a detailed description of the construction and operation of such a trailer is not deemed necessary herein. The side panel assemblies 10 of the present invention are adapted to be connected to a conventional trailer with some modification of the trailer to provide the trailer side walls for enclosing a space 40 for accommodating a load within the trailer 12. It should be noted that, although the side panel assembly 10 of the present invention is described herein with respect to a particular trailer 12 construction, the side panel assemblies 10 of the present invention are adapted to be utilized in conjunction with any conventional trailer for providing the trailer side walls and could be incorporated in a new trailer designed specifically to utilize the side panel assembly 10. Also, it should be noted that the term "trailer side walls" as used herein refers to the walls of the trailer extending along each side of the trailer and generally between the opposite ends of the trailer and also refers to the walls extending along each end of the trailer generally between the opposite sides of the trailer, the latter sometimes being referred to in the art as "trailer end walls".

The side panel assembly 10 includes a plurality of side panels 42. Each side panel 42 has an upper end 44, a lower end 46 and opposite sides 48 and 50 (the sides 48 and 50 being shown in FIG. 9), the ends 44 and 46 and the sides 48 and 50 being designated in FIG. 2 with respect to one of the side panels 42. Each side panel 42 is generally rectangularly shaped and includes a front wall 52 extending generally between the upper and the lower ends 44 and 46 and generally between the opposite sides 48 and 50, and a back wall 54 extending generally between the upper and the lower ends 44 and 46 and generally between the opposite sides 48 and 50. In an assembled position of the side panel 42 operatively connected to the trailer 12, the back wall 54 generally faces the space 40 and the trailer floor 26 and the front wall 52 generally faces away from the space 40 and the trailer floor 26, the front wall 52 of each of the side panels 42 cooperating to form the outer peripheral surface of the trailer side wall. In one preferred embodiment, each of the side panels 42 can be constructed of a plyboard-type of material and the side panel assembly 10 particularly is adapted to provide the structural integrity to each of the plyboard constructed side panels 42 during the operation of the side panel assembly 10 with each of the side panels 42 operatively connected to the trailer 12.

As shown more clearly in FIGS. 4, 5 and 6, a plurality of hinge openings 56 are formed through each of the side panels 42, each of the hinge openings 56 extending through and intersecting the front and the back walls 52 and 54 of the side panel 42, one hinge opening 56 being particularly shown in FIGS. 5 and 6 and three hinge openings on each side panel being indicated in FIGS. 1 and 2 in a manner which will be made more apparent below. Each of the hinge openings 56 is disposed generally near the lower end 46 of the side panel 42 and the hinge openings 56 are spaced generally along the side panel 42 generally between the opposite sides 48 and 50. A plurality of floor openings 58 are formed through the trailer floor 26 with each of the floor openings 58 being positioned generally adjacent one of the side support beams 22 and 24 and with each of the floor openings 58 being generally aligned with one of the hinge openings 56 in one of the side panels 42 (one floor opening 58 being shown in FIGS. 5 and 6). As shown in FIGS. 5 and 6, each of the floor openings 58 provides access to one of the side support beams 22 and 24 on the trailer 12, for reasons which will be made more apparent below.

A plurality of hinge assemblies 60 are connected to the back wall 54 of each of the side panels 42 and, in the embodiment of the invention shown in the drawings, three hinge assemblies 60 are connected to each of the side panels 42 with each hinge assembly 60 being disposed generally adjacent or near one of the hinge openings 56 and being generally aligned with one of the floor openings 58.

Each hinge assembly includes a hinge plate 62 which is connected to the front wall 52 of one of the side panels 42. Each hinge plate 62 is disposed to cover a substantial portion of one of the hinge openings 56 formed through the side panel 42. Each hinge assembly 60 also includes a pair of hinge supports 64 and 66 (shown in FIGS. 5, 6 and 7). The hinge supports 64 and 66 are spaced a distance apart and each of the hinge supports 64 and 66 is disposed generally within one of the hinge openings 56 formed through the side panel 42. The hinge supports 64 and 66 each include an opening 68 and 70, respectively, with each opening 68 and 70 extending through and intersecting the opposite ends of the respective hinge supports 64 and 66.

Each hinge assembly 60 also includes a hinge shaft 72 having opposite ends with one end portion of the hinge shaft 72 being journally supported in the opening 68 of the hinge support 64 and the opposite end portion of the hinge shaft 72 being journally supported within the opening 70 and the other hinge support 66.

Each hinge assembly 60 also includes a hinge member 74 having a pivot end 76 and a connecting end 78. The hinge member 74 more particularly comprises a flat plate 80 having opposite ends with one end of the flat plate 80 being secured to the hinge shaft 72 and forming the pivot end of the hinge assembly 60 and a flange 82 being formed on the opposite end of the flat plate 80, the flange 82 extending at an angle to the flat plate 80 and cooperating with a portion of the flat plate 80 generally near the flange 82 to form the connecting end 78 of the hinge member 74.

The pivot end 76 of each hinge assembly 68 thus is pivotally connected to the back wall 54 of the side panel 42. Each hinge member 74 extends from the back wall 54 of one of the side panels 42 through one of the floor openings 58 so that the connecting end 78 of each hinge member 74 is disposed through one of the floor openings 58 and is disposed generally near one of the side support beams 22 or 24 when the side panel 42 is operatively connected to the trailer 12.

It should be noted that the hinge assemblies 60 could be connected to the back wall 54 of the side panels 42, thereby eliminating the hinge openings 56, if desired in a particular application.

A stiffener channel 84 is connected to the lower end 46 of each of the side panels 42 and each stiffener channel 84 extends generally along the lower end 46 generally between the opposite sides 48 and 50 of each of the side panels 42. The hinge plates 62 on each of the side panels 42 is connected or secured to the stiffener channel 84 which is connected to the lower end of that side panel 42, the hinge plates 62 being spaced generally along the stiffener channel 84.

Each side panel 42 includes an end panel connector 86. The end panel connector 86 is connected to the side 48 of the panel 42 and the end panel connector 86 extends generally between the upper and the lower ends 44 and 46 of the side panel 42. A connecting panel flange 88 extends a distance from the side 48 of the side panel 42 when the end panel connector 86 is connected to the end 48 and the connecting panel flange 88 extends in a plane substantially coplanar with the front wall 52 of the side panel 42. A spacer channel 90 is formed in each end panel connector 86 with the spacer channel 90 being interposed generally between the connection of the end panel connector 86 to the side panel 42 and the connecting panel flange 88. The connecting panel flange 88 extends generally between the upper and the lower ends 44 and 46 of the side panel 42.

In operation, each of the side panels 42 is disposed on the trailer floor 26 generally near one of the side support beams 22 or 24 and each of the hinge members 74 is oriented so that the connecting end 78 of each of the hinge members 74 is disposed through one of the floor openings 58 formed in the trailer floor 26 with the connecting ends 78 of each hinge member 74 being operatively disposed near one of the side support beams 22 and 24. The side panels 42 are disposed in a side-to-side relationship about the outer periphery of the trailer 12 formed by the sides 14 and 16 and the ends 18 and 20 so that the side panels 42 cooperate to form the side walls of the trailer 12.

Each side panel 42 is movable to an upright position (shown in FIGS. 1, 2, 3, 4, 5, 7, 8 and 9) wherein the lower end 44 of each side panel 42 is disposed generally adjacent the trailer floor 26 and generally near one of the sides 14 and 16 or one of the ends 18 and 20 of the trailer 12. In the upright position, each side panel 42 extends a distance generally upwardly and generally perpendicularly from the trailer floor 26 terminating with the upper ends 44 of the side panels 42. When the side panels 42 have been moved to the upright position, the flange 82 portion of each of the hinge assemblies 60 engages the beam flange 34 formed on one of the side support beams 24 or 26 thereby limiting the movement of the side panel 42 in a direction 92 (shown in FIGS. 3, 4 and 5) generally away from the side support beam 22 or 24 and generally away from the trailer floor 26 thereby securing the side panel 42 in the upright position (shown more clearly in FIG. 5). Each side panel 42 is held in the upright position by the connecting engagement between the flange 82 and the portion of the hinge member 74 generally near the flange 82 and the beam flange 34 on one of the side support beams 22 or 24.

Each side panel 42 also is movable in a direction 94 (shown in FIGS. 3, 4 and 5) from an upright position to a storage position wherein each of the side panels 42 is disposed generally adjacent the trailer floor 26. As the side panel 42 is moved in the direction 94 toward the storage position, each of the hinge members 74 is moved through one of the floor openings 58 in the general direction 94 thereby disconnecting the connecting engagement between the connecting end 78 of the hinge assembly 60 and the side support beam 22 or 24, the hinge assembly 60 being shown in FIG. 6 in a disconnected position wherein the connecting end 78 of the hinge assembly 60 is disconnected from the beam flange 34 of the side support beam 22 or 24.

The load is placed in the space 40 and supported generally within the space encompassed by the trailer side walls formed by the side panels 42 during one aspect of the operation of the side panel assembly 10. The load within the space 40 imposes a force on the back wall 54 of each of the side panels 42 in a general direction 98 (shown in FIGS. 3, 4 and 5) tending to move each of the side panels 42 outwardly away from the side 14 or 16 of the trailer 12 and generally away from the trailer floor 26. The force imposed by the load in the space 40 in the direction 98 tends to tighten the connecting engagement between the connecting end 78 of each of the hinge assemblies 60 and the beam flange 34 of one of the side support beam 22 or 24 thereby more securely connecting each of the hinge assemblies 60 to the side support beams 22 or 24. Further, the force imposed by the load in the space 40 in the general direction 98 along with the cooperating force imposed by the connection between the connecting end 78 of each of the hinge assemblies 60 and the side support beams 22 or 24 tends to impose a force in a downward direction 100 (shown in FIGS. 3, 4 and 5) on each of the side panels 42 thereby tightening the sealing engagement between the lower end 46 of each of the side panels 42 and the trailer floor 26. This tightening of the sealing engagement between the lower end 46 of each of the side panels 42 and the trailer floor 26 particularly is important when hauling such loads as grain which might leak through such openings.

It should be noted that the hinge assembly 60 of the present invention provides the structural integrity required to maintain the connection between the side panels 42 and the trailer 12 since the connecting end 78 of each of the hinge members 74 is in connecting engagement with a structurally sound side support beam 22 or 24 when the side panels 42 have been moved to the upright position bringing the hinge assembly 60 into connecting engagement with the side support beams 22 or 24. Since the connecting engagements between the hinge assemblies 60 and the side support beams 22 and 24 are movable, when the load has been removed from the space 40, each of the panels 42 easily can be pivoted in the general direction 94 toward the trailer floor 26 to the storage position wherein each of the side panels 42 is supported generally on the trailer floor 26.

To form the trailer 12 side wall, the side panels 42 each are supported in an upright position around the sides 14 and 16 and the ends 18 and 20 of the trailer 12 with the side panels 42 being disposed in a side-to-side relationship. In the side-to-side relationship of the side panels 42, the side 48 of each of the side panels 42 is disposed generally near the side 50 of the adjacent side panel 42. More particularly, each side panel 42 is oriented so that the side 48 thereof having the end panel connector 86 connected thereto is disposed generally adjacent the side 50, opposite the side 48 having the end panel connector 86 connected thereto, of an adjacent side panel 42. As shown more clearly in FIG. 9, in an upright position of the side panels 42 and with the side panels 42 disposed in a side-to-side relationship, the side 48 having the end panel connector 86 connected thereto of the side panel 42 is disposed generally adjacent or near and spaced a distance from the side 50 (opposite the side having the end panel connector 86 connected thereto) of the adjacent side panel 42. In this side-to-side relationship, the spacer channel 90 is disposed generally between the side 48 of the panel 42 and the side 50 of the generally adjacent side panel 42. In this position, the connecting panel flange 88 extends a distance generally over a portion of the front wall 52 generally near the side 50 of the adjacent side panel 42 and the connecting panel flange 88 is disposed in sliding engagement with the front wall 52 portion of the adjacent side panel 42 so that the adjacent side panels 42 are not rigidly interconnected by means of bolts or other such rigid connecting means; but, rather, the adjacent side panels 42 are connected in a sliding relationship so that the side panel 42 is free to move in directions 102 and 103 (shown in FIG. 9) during the operation of the side panel assembly 10. Further, in the upright position of the side panels 42 and when the side panels 42 are positioned in the operative side-to-side relationship, the connecting panel flange 88 on each of the side panels 42 is disposed generally over the space between the end 50 of the adjacent side panel 42 and the side 48 of the side panel 42 having the end panel connector 86 connected thereto.

When a load is disposed in the space 40, the load imposes a force in the direction 98 generally outwardly from the trailer floor 26 and generally outwardly from the side 14 or 16 of the trailer 12 and this force imposed by the load forces the portion of the end panel 42 generally near the side 50 into tighter sealing engagement with the portion of the end panel connector 86 connected to the adjacent side panel 42 thereby increasing the sealing integrity between adjacent side panels. This increase in sealing integrity between adjacent side panels 42 particularly is important when hauling loads such as grains which easily can seep through cracks between the side panels forming the trailer side wall. Further, the sliding connection between the adjacent side panels 42 permits some movement of each side panel 42 relative to the adjacent side panels 42 during the operation of the trailer 12 which reduces stresses which might occur between adjacent side panels which are interconnected mechanically by bolts or other such rigid interconnecting means.

When the side panels 42 have been positioned in the upright position, an overhead brace assembly 104 (shown more clearly in FIGS. 3 and 8) is connected to the upper ends 44 of the side panels 42 which are positioned along the sides 14 and 16 of the trailer 12. The overhead brace assembly 104 comprises a pair of overhead channels 106 and 108 with the overhead channel 106 being disposed generally over the upper ends 44 of the side panels 42 extending along the side 14 of the trailer 12 and with the overhead channel 108 being disposed generally over the upper ends 44 of the side panels 42 extending along the opposite side 16 of the trailer 12. A plurality of spaced apart overhead braces 110 are connected between the overhead channels 106 and 108 and a plurality of arcuately shaped roof supports 112 also extend between and are connected to the overhead channels 106 and 108. The overhead brace assembly 104 cooperates to secure the side panels 42 in an upright position and provides structural support for placing a tarp over the top of a trailer which may be desirable in some applications.

Changes may be made in the construction and operation of the various components and assemblies described herein without departing from the spirit and scope of the invention as defined in the following claims.

What is claimed is:

1. A side panel assembly adapted for connection to a trailer having opposite sides, opposite ends, a trailer floor and a pair of side support beams with each side support beam extending generally along one side of the trailer, comprising:

a side panel having an upper end, a lower end and opposite sides, the side panel being positionable in an upright position generally near one side of the trailer with the lower end of the side panel being disposed generally near the trailer floor and the side panel extending a distance upwardly from the trailer floor terminating with the upper end of the side panel and the side panel extending a distance generally along at least a portion of one side of the trailer in the upright position of the side panel and at least one hinge opening extending through the side panel intersecting a front wall and a back wall of the side panel; and at least one hinge assembly, each hinge assembly having a pivot end pivotally connected to the side panel and an opposite connecting end connectable to one of the side support beams in an upright position of the side panel, the connecting end of the hinge assembly being removably connected to a portion of one of the side support beams in an upright position of the side panel and substantially preventing movement of the side panel in a direction generally away from the trailer floor in an upright position of the side panel with the connecting end of the hinge assembly removably connected to a portion of one of the side support beams;

a hinge plate connected to the front wall of the side panel, each hinge plate convering a substantial portion of one of the hinge openings in the side panel;

a pair of hige supports connected to the hinge plates and disposed generally within one of the hinge openings in the side panel, the hinge supports being spaced a distance apart and each hinge support including an opening extending a distance therethough;

a hinge shaft, each hinge shaft extending between the pair of hinge supports and each hinge shaft including opposite end portions with one end portion being journally supported in the opening in one of the hinge supports and an opposite end portion being journally supported in the other hinge support; and a hinge member having one end secured to the hinge shaft forming the pivot end and an opposite end of the hinge member forming the connecting end.

2. The side panel assembly of claim 1 wherein the hinge member is defined further as including a substantially flat plate with a flange formed on one end thereof extending at an angle to the flat plate, the flange and a portion of the flat plate generally near the flange forming the connecting end of the hinge assembly.

3. The side panel assembly of claim 1 wherein the trailer floor includes floor openings formed through portions of the trailer floor generally near one of the side support beams, and wherein each hinge assembly is defined further as having a portion of the hinge member, generally near the connecting end, disposed within one of the floor openings in the trailer floor, the side panel being movable from the upright position to a storage position wherein the side panel is disposed generally on a portion of the trailer floor, the hinge member being removed from connecting engagement with one of the side support beams and moved further into the floor opening in the trailer floor as the side panel moves from the upright position to the storage position.

4. The side panel assembly of claim 1 wherein a plurality of side panels are connectable to a trailer with the side panels being disposed in a side-to-side relationship to form a trailer side wall, and wherein each side panel includes a front wall and a back wall, and wherein each side panel is defined further to include:

a plurality of end panel connectors, each end panel connector having a portion connected to one side of one of the side panels and extending generally between the upper end and the lower end of the side panel, a connecting panel flange extending a distance from the side of the side panel in a plane substantially coplanar with the front wall of the side panel, the side of each side panel opposite the side having the end panel connector connected thereto being disposed near and spaced a distance from the side of an adjacent side panel having the end panel connector connected thereto in an assembled side-to-side relationship of the side panels with the connecting panel flange extending a distance over a portion of the front wall of the adjacent side panel to substantially cover the space between the generally adjacent sides of the two generally adjacent side panels, the space between the sides of adjacent side panels permitting some movement of the side panel relative to the adjacent side panel in directions generally between the opposite sides of the side panels in an assembled side-to-side relationship of the side panels.

5. The side panel assembly of claim 4 wherein a load on the trailer floor bearing against the back walls of the side panels acts to move the front side of each side panel against the connecting panel flange on the adjacent side panel, thereby increasing the sealing engagement therebetween.

6. The side panel assembly of claim 5 wherein the engagement between the connecting panel flange on one side panel and the front wall of the adjacent side panel is defined further as a sliding engagement.

7. The side panel assembly of claim 1 defined further to include:

a stiffener channel connected to the lower end of each side panel and extending a distance generally between the opposite sides of the side panel, the hinge plates being connected to the stiffener channel and the hinge plates being spaced generally along the stiffener channel.

8. A side panel assembly adapted for connection to a trailer having opposite sides, opposite ends and a trailer floor comprising:

a plurality of side panels, each side panel having an upper end, a lower end and opposite sides, each side panel being positionable in an upright position generally near one side of the trailer with the lower end of each side panel being disposed generally near the trailer floor and each side panel extending a distance upwardly from the trailer floor terminating with the upper end of the side panel and each side panel extending a distance generally along at least a portion of one side of the trailer in the upright position of the side panels, the side panels being disposed in a side-to-side relationship to form a trailer wall and each side panel having a front wall and a back wall; and a plurality of end panel connectors, each end panel connector having a portion connected to one side of one of the side panels and extending generally between the upper end and the lower end of the side panel, a connecting panel flange extending a distance from the side of the side panel in a plane substantially coplanar with the front wall of the side panel, the side of each side panel opposite the side having the end panel connector connected thereto being disposed near and spaced a distance from the side of an adjacent side panel having the end panel connector connected thereto in an assembled side-to-side relationship of the side panels with the connecting flange extending a distance generally over a portion of the front wall of the adjacent side panel to substantially cover the space between the generally adjacent sides of two generally adjacent side panels, the space between the sides of the adjacent side panels permitting some movement of the side panel relative to the adjacent side panel in directions generally between the opposite sides of the side panels in an assembled side-to-side relationship of the side panels, each end panel connector including a spacer channel disposed generally between the end of the side panel connected to the end panel connector and the end of an adjacent side panel for spacing the ends of the adjacent side panels a predetermined minimum distance apart.

9. The side panel assembly of claim 8 wherein the load on a trailer floor imposes a force generally against the back walls of the side panels acting to move the front side of each side panel against the connecting panel flange on the adjacent side panel thereby increasing the sealing engagement therebetween.

10. A side panel assembly adapted for connection to a trailer having opposite sides, opposite ends, a trailer floor and a pair of side support beams with each side support beam extending generally along one side of the trailer, comprising:

a side panel having an upper end, a lower end and opposite sides, the side panel being positionable in an upright position generally near one side of the trailer with the lower end of the side panel being disposed generally near the trailer floor and the side panel extending a distance upwardly from the trail floor terminating with the upper end of the side panel and the side panel extending a distance generally along at least a portion of one side of the trailer in the upright position of the side panel, the side panel including a front wall and a back wall; and at least one hinge assembly, each hinge assembly having a pivot end pivotally connected to the side panel and an opposite connecting end connectable to one of the side support beams in an upright position of the side panel, the connecting end of the hinge assembly being removably connected to a portion of one of the side support beams in an upright position of the side panel and substantially preventing movement of the side panel in a direction generally away from the trailer floor in an upright position of the side panel with the connecting end of the hinge assembly removably connected to a portion of one of the side support beams said hinge assembly further including:

a pair of hinge supports connected to the back wall of the side panel, the hinge supports being spaced a distance apart and each hinge support including an opening extending a distance therethrough;

a hinge shaft, each hinge shaft extending between the pair of hinge supports and each hinge shaft including opposite end portions with one end portion being journally supported in the opening in one of the hinge supports and an opposite end portion being journally supported in the other hinge support; and a hinge member having one end secured to the hinge shaft forming the pivot end and an opposite end of the hinge member forming the connecting end.

11. The side panel assembly of claim 10 wherein the hinge member is defined further as including a substantially flat plate with a flange formed on one end thereof extending at an angle to the flat plate, the flange and a portion of the flat plate generally near the flange forming the connecting end of the hinge assembly.

12. The side panel assembly of claim 10 wherein the trailer floor includes openings formed through portions of the trailer floor generally near one of the side support beams, and wherein each hinge assembly is defined further as having a portion of the hinge member, generally near the connecting end, disposed within one of the openings in the trailer floor, the side panel being movable from the upright position to a storage position with the side panel being disposed generally on a portion of the trailer floor, the hinge member being removed from connecting engagement with one of the side support beams and moved further into the opening in the trailer floor as the side panel moves from the upright position to the storage position.

* * * * *

UNITED STATES PATENT AND TRADEMARK OFFICE
CERTIFICATE OF CORRECTION

PATENT NO. : 4,613,182

DATED : September 23, 1986

INVENTOR(S) : Jack C. Stone

It is certified that error appears in the above-identified patent and that said Letters Patent is hereby corrected as shown below:

Claim 1

Column 7, line 37, please delete the word "convering" and therefor substitute the word --covering--.

Column 7, line 40, please delete the word "hige" and therefor substitute the word --hinge--.

Signed and Sealed this

Twenty-seventh Day of January, 1987

*Attest:*

DONALD J. QUIGG

*Attesting Officer*    *Commissioner of Patents and Trademarks*